(12) United States Patent
Furuya (10) Patent No.: US 7,120,015 B2
(45) Date of Patent: Oct. 10, 2006

(54) ELECTRONIC APPARATUS

(75) Inventor: Hiroyuki Furuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 66 days.

(21) Appl. No.: 10/995,481

(22) Filed: Nov. 24, 2004

(65) Prior Publication Data

US 2006/0028795 A1 Feb. 9, 2006

(30) Foreign Application Priority Data

Aug. 9, 2004 (JP) ............................. 2004-232442

(51) Int. Cl.
*H05K 7/20* (2006.01)

(52) U.S. Cl. ...................... 361/687; 361/683; 361/690; 361/695; 181/207; 70/58; 381/333

(58) Field of Classification Search ................ 361/683, 361/687, 689, 692–695; 381/300–304, 333–336, 381/386, 387–388; 181/284–286, 290, 294, 181/205, 207, 208, 210; 248/634, 638, 676, 248/678, 443, 127

See application file for complete search history.

(56) References Cited

U.S. PATENT DOCUMENTS

| | | | | |
|---|---|---|---|---|
| 4,739,637 A | * | 4/1988 | Finkel et al. | ................... 70/58 |
| 6,597,794 B1 | * | 7/2003 | Cole et al. | ................... 381/333 |
| 6,816,371 B1 | * | 11/2004 | Agata et al. | ................. 361/687 |
| 6,845,841 B1 | * | 1/2005 | Smith et al. | ................. 181/207 |

FOREIGN PATENT DOCUMENTS

| | | |
|---|---|---|
| JP | 4-48693 | 2/1992 |
| JP | 4-284519 | 10/1992 |
| JP | 408148868 A * | 6/1996 |

* cited by examiner

*Primary Examiner*—Michael Datskovskiy
(74) *Attorney, Agent, or Firm*—Westerman, Hattori, Daniels & Adrian, LLP.

(57) ABSTRACT

An electronic apparatus is placed on an installation surface during use, and ensures comfortable use for users. The electronic apparatus includes a housing and a fan. The housing accommodates an electronic component, and includes a bottom face to be placed on the installation surface during use, and a front face standing from the bottom face to define a front edge of the housing, and facing the user during use. The fan is provided inside the housing to exhaust air out of the housing. The housing further includes an exhaust opening pointing in an obliquely upward and sideward direction, and the air from the fan is exhausted through the exhaust opening.

11 Claims, 11 Drawing Sheets

ELECTRONIC APPARATUS

BACKGROUND OF THE INVENTION

1. Field of the Invention

The present invention relates to an electronic apparatus to be placed on an installation surface during use.

2. Description of the Related Art

Most electronic apparatuses, such as personal computers, have, inside a housing, a fan for exhausting air out of the housing for heat radiation because electronic components contained in the housing generate heat. For example, Japanese Unexamined Patent Application Publication Nos. 4-48693 (FIG. 5) and 4-284519 (FIG. 5) disclose notebook personal computers in which a main housing containing electronic components such as a CPU (Central Processing Unit) is pivotally connected to a display housing having a liquid crystal display panel so as to be placed on the display housing. The notebook computers are used in a state in which the main housing is placed on an installation surface and the display housing is opened to slightly tilt rearward remote from a front user. The personal computer disclosed in Japanese Unexamined Patent Application Publication No. 4-48693 includes a fan for exhausting air out of the main housing, and two exhaust openings through which the air from the fan is exhausted. Air passing through one of the exhaust openings is exhausted obliquely upward and toward the user, and the other exhaust opening points in the horizontal direction. In contrast, the personal computer disclosed in Japanese Unexamined Patent Application Publication No. 4-284519 includes an exhaust opening pointing obliquely upward and rearward.

In the notebook personal computer disclosed in the former publication, air exhausted from one of the exhaust openings hits the user, and a comfortable operating environment cannot be ensured. Moreover, air exhausted from the other exhaust opening hits the installation surface, and produces wind noise. This also damages the operating environment. In the notebook personal computer disclosed in the latter publication, air exhausted from the exhaust opening pointing rearward hits not only the opened display housing, but also a wall disposed behind the notebook personal computer. This produces wind noise that annoys the user.

Wind noise is also produced when the velocity of air increases at the exhaust opening.

In addition, when sound produced inside the main housing, for example, noise of fan driving, is transmitted to the user, the operating environment is also damaged.

SUMMARY OF THE INVENTION

The present invention has been made in view of the above circumstances, and provides an electronic apparatus that ensures comfortable use for users.

A first aspect of the present invention provides an electronic apparatus to be placed on an installation surface during use. The electronic apparatus includes a housing that accommodates an electronic component, and that has a bottom face to be placed on the installation surface during use, and a front face standing from the bottom face to define a front edge of the housing and facing a user during use; and a fan provided inside the housing to exhaust air out of the housing. The housing further includes an exhaust opening pointing in an obliquely upward and sideward direction, and the air from the fan is exhausted through the exhaust opening.

A second aspect of the present invention provides an electronic apparatus to be placed on an installation surface during use. The electronic apparatus includes a housing that accommodates an electronic component, and that has a bottom face to be placed on the installation surface during use, and a front face standing from the bottom face to define a front edge of the housing and facing a user during use; and a fan provided inside the housing to exhaust air out of the housing. The housing further includes an exhaust opening pointing sideward so that the air from the fan is exhausted therethrough, and a duct provided inside the housing to direct the air from the fan obliquely upward toward the exhaust opening.

In the electronic apparatuses of the present invention, since air is exhausted from the exhaust opening in the obliquely upward and sideward direction, it does not hit the installation surface. Even if a wall is provided behind the electronic apparatus, or even if the housing is opened to slightly tilt rearward, the air does not hit the wall or the housing, and wind noise that annoys the user can be avoided. Moreover, since the exhaust air does not hit the user, the user can comfortably use the electronic apparatus.

Preferably, the exhaust opening is provided above the vertical center of the housing.

This can more reliably prevent air exhausted from the exhaust opening from hitting the installation surface.

Preferably, the electronic apparatus further includes a heat conductor that conducts heat from the electronic component and that has an upper surface inclined upward toward the exhaust opening, and a bottom face of the duct is defined by the upper surface.

Heat from the electronic component is efficiently radiated by the heat conductor.

Preferably, the upper surface of the duct has an inclined portion inclined away from the bottom face toward the exhaust opening.

When the upper surface of the duct is horizontal while the bottom surface is inclined obliquely upward, the duct is narrowed toward the exhaust opening, and the velocity of air passing through the duct increases, and wind noise may be produced when the air passes through the exhaust opening. However, since the duct upper surface has the inclined portion, the velocity of air decreases at the inclined portion, and wind noise is not produced at the exhaust opening.

Preferably, the duct includes a plurality of fins standing from the heat conductor inside the duct so that air channels are provided between the fins. Radiation is further promoted by the fins.

A third aspect of the present invention provides an electronic apparatus to be placed on an installation surface during use. The electronic apparatus includes a housing that accommodates an electronic component, and that has a bottom face to be placed on the installation surface during use, and a front face standing from the bottom face to define a front edge of the housing and facing a user during use; and a fan provided inside the housing to exhaust air out of the housing. The housing further includes an exhaust opening from which the air from the fan is exhausted, and a duct provided inside the housing to direct the air from the fan toward the exhaust opening. The duct has a pair of opposing standing walls, and the standing walls have respective wide portions that extend away from each other toward the exhaust opening.

In the third aspect, since the velocity of air passing through the exhaust opening is decreased by the wide portions, wind noise that annoys the user can be avoided.

A fourth aspect of the present invention provides an electronic apparatus to be placed on an installation surface during use. The electronic apparatus includes a housing that accommodates an electronic component, and that has a bottom face to be placed on the installation surface during use, the bottom face having an opening from which sound produced inside the housing leaks, and a front face standing from the bottom face to define a front edge of the housing and facing a user during use; and a sound insulator clamped between the bottom face and the installation surface to prevent the sound leaking from the opening from further leaking forward along the bottom face.

The opening refers to, for example, a suction opening of a fan provided in the bottom face to send air inside the housing to the outside, or a space in which a cover member is detachably fitted. The size and shape of the opening are not limited.

In the fourth aspect, since sound produced inside the housing is prevented from being transmitted to the front user, the user can comfortably use the electronic apparatus.

Preferably, the sound insulator entirely covers the bottom face in order to enhance sound insulation performance.

The sound insulator may be made of a foamed material that is resiliently squashed when being clamped between the bottom face and the installation surface. Alternatively, the sound insulator may perform sound elimination by causing a sound wave to travel therethrough.

That is, when the sound insulator is made of a formed material, it functions as a sound absorber. When the sound insulator eliminates sound, it functions as a silencer.

According to the present invention, it is possible to provide an electronic apparatus that ensures comfortable use for users.

DETAILED DESCRIPTION OF THE INVENTION

Embodiments of the present invention will be described below with reference to the attached drawings.

Figure 1:
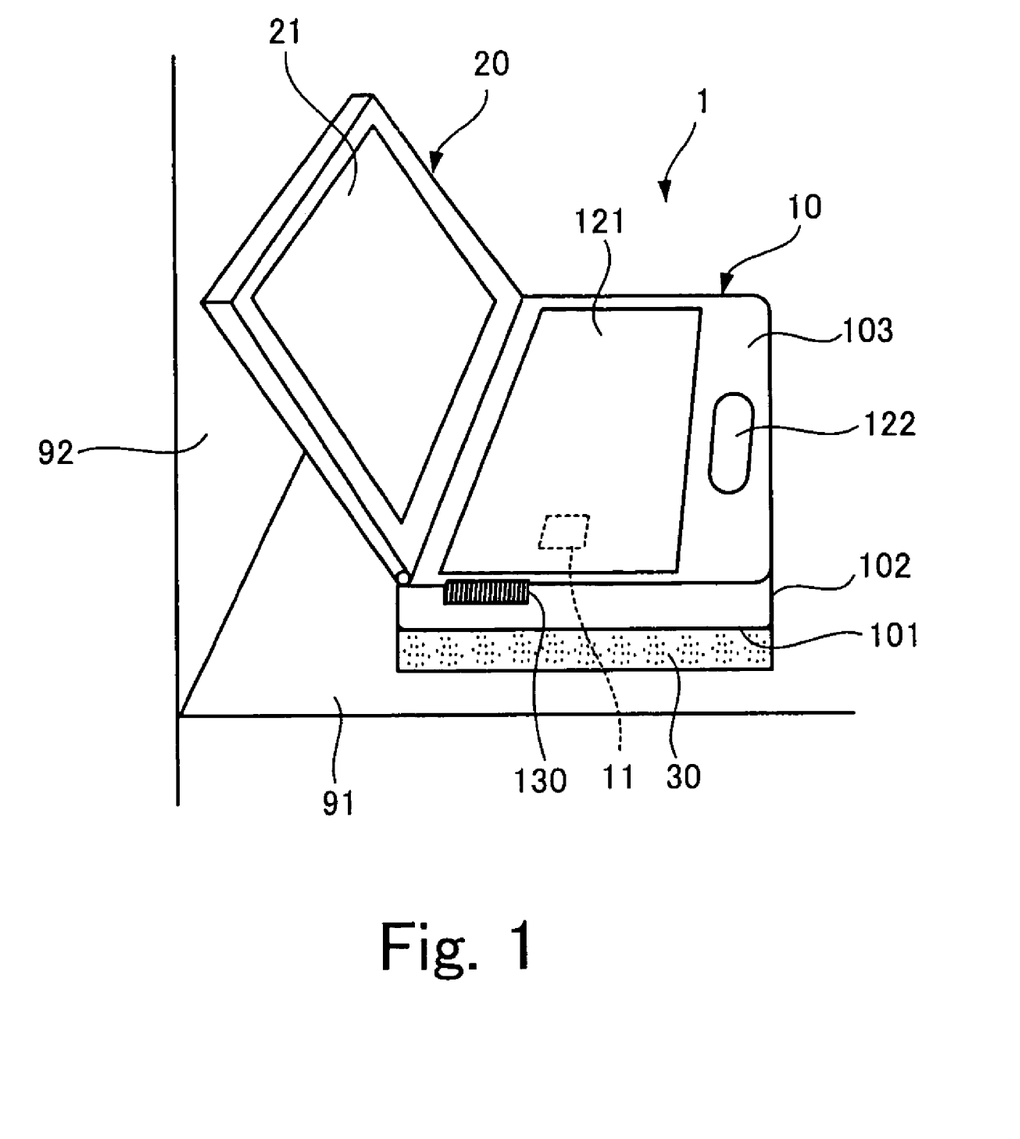
FIG. 1 is a schematic view of a notebook personal computer serving as an electronic apparatus according to a first embodiment of the present invention.

FIG. 1 shows a notebook personal computer serving as an electronic apparatus according to a first embodiment of the present invention.

A notebook personal computer 1 shown in FIG. 1 is an electronic apparatus in which a display housing 20 having a liquid crystal display panel 21 is pivotally connected to a main housing 10 incorporating electronic components, such as a CPU (Central Processing Unit) 11, so that it can be placed on the main housing 10. During use, the main housing 10 is placed on an installation surface, and the display housing 20 is opened to slightly tilt rearward remote from the front user side. In FIG. 1, the notebook personal computer 1 is placed on a desk 91, and the display housing 20 is open. The right and left sides of FIG. 1 are designated, respectively, as the front side (user side) and the rear side of the notebook personal computer 1. When the display housing 20 is open, the liquid crystal display panel 21 faces the user. The main housing 10 is flat, and includes a bottom face 101 to be placed on the installation surface, that is, on the desk 91, a front face 102 that stands from the bottom face 101 to define a front end and that faces the user during use, and an upper face 103 remote from the bottom face 101. A keyboard 121 and a touch pad 122 are mounted on the upper face 103. When the display housing 20 is open, the user can operate the keyboard 121 and the touch pad 122. In FIG. 1, a wall 92 is provided on the rear side of the desk 91.

An exhaust opening 130 is provided on a side of the main housing 10, and a fan 15 is provided inside the main housing 10. Air inside the main housing 10 is exhausted by the fan 15.

Figure 2:
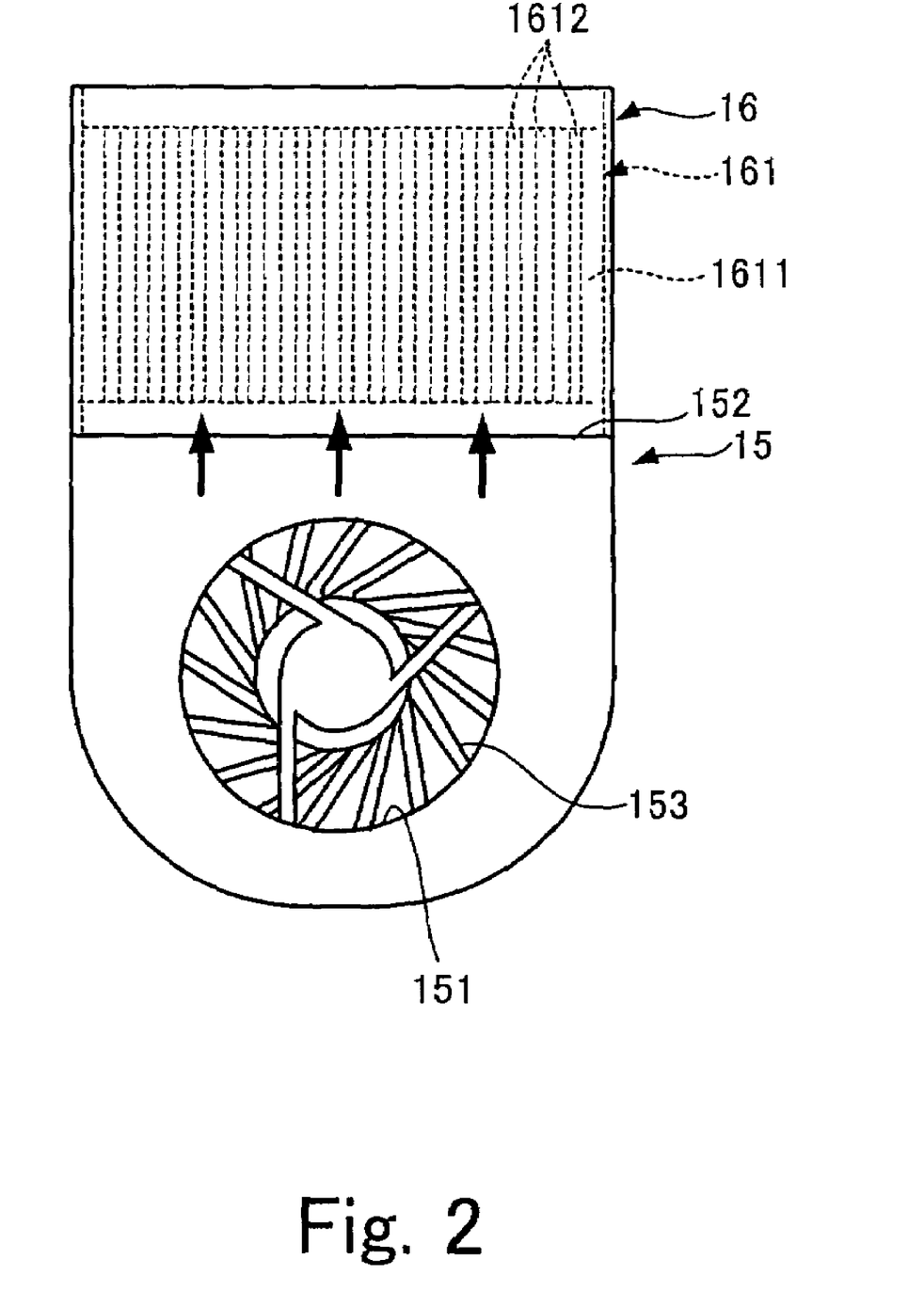
FIG. 2 is an explanatory view of a fan incorporated in a main housing of the notebook personal computer shown in FIG. 1.

FIG. 2 shows the fan 15 incorporated in the main housing 10.

The fan 15 shown in FIG. 2 is a flat sirocco fan, and has a circular air intake 151 and an air outlet 152. The fan 15 is disposed above the bottom face 101 inside the main housing 10 so that the air intake 151 opposes the bottom face 101. The air outlet 152 faces the exhaust opening 130 shown in FIG. 1. When an impeller 153 of the fan 15 rotates, air on the front side of the plane of FIG. 2 is sucked, and the sucked air is exhausted toward the upper side of the plane of the figure, as shown by the arrows.

A duct 16 communicating with the exhaust opening 130 is connected to the air outlet 152 shown in FIG. 2. The size of an aperture of the duct 16 is equal to the size of the exhaust opening 130. A heat sink 161 is also provided inside the main housing 10. The heat sink 161 includes a plate-shaped heat conductor 1611 for conducting heat from the electronic components, such as the CPU 11, incorporated in the main housing 10, and a plurality of fins 1612 standing in contact with the heat conductor 1611 so as to define air channels between the fins 1612. A bottom face of the duct 16 is defined by an upper surface of the heat conductor 1611, and the fins 1612 stand inside the duct 16. Air exhausted from the air outlet 152 of the fan 15 passes through the fins 1612, and reaches the exhaust opening 130 shown in FIG. 1. Heat produced by, for example, the CPU 11 is radiated by the heat sink 161, and air passes through the fins 1612, thereby enhancing the cooling effect.

Figure 3:
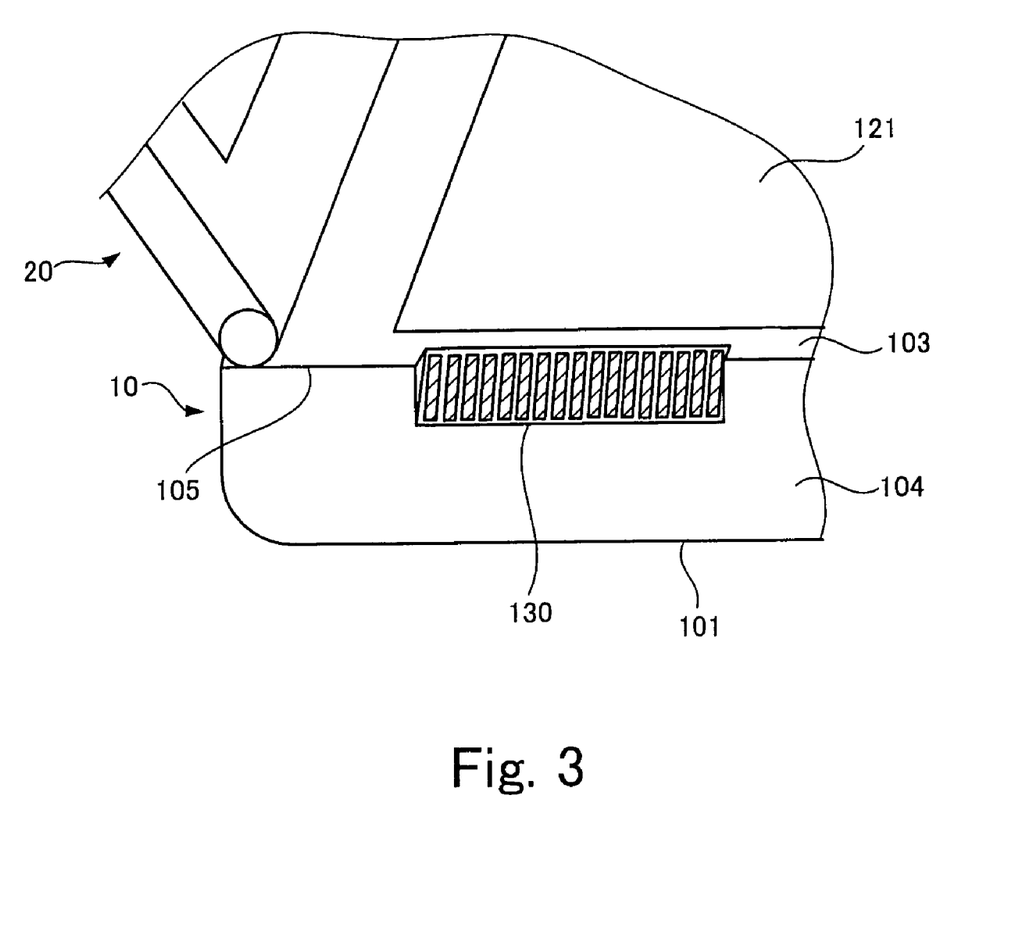
FIG. 3 is an enlarged view of a side section of the main housing in which an exhaust opening is provided.

FIG. 3 is an enlarged view of the side of the main housing 10 having the exhaust opening 130.

Air supplied from the fan 15 shown in FIG. 2 is exhausted from the exhaust opening 130 shown in FIG. 3, and the exhaust opening 130 points in an obliquely upward and sideward direction. The exhaust opening 130 is inclined at angle of 15° to the normal to the installation surface on which the main housing 10 is placed so that it is offset from a side face 104 standing from an edge of the bottom face 101 toward the keyboard 121 beyond a borderline 105 between the upper face 103 and the side face 104. Therefore, air supplied from the fan 15 is exhausted in the obliquely upward and sideward direction, and does not hit the installation surface on the desk 2 shown in FIG. 1. Moreover, since the exhaust opening 130 is provided above the vertical center of the flat main housing 10, exhaust air is more effectively prevented from hitting the installation surface on the desk 2. In addition, exhaust air is discharged sideward, it does not hit the rear wall 92 and the display housing 20 slighting tilting rearward shown in FIG. 1. Therefore, wind noise is prevented from being produced by exhaust air. Furthermore, since the exhaust air does not hit the user, the user can comfortably use the notebook personal computer 1.

Figure 4:
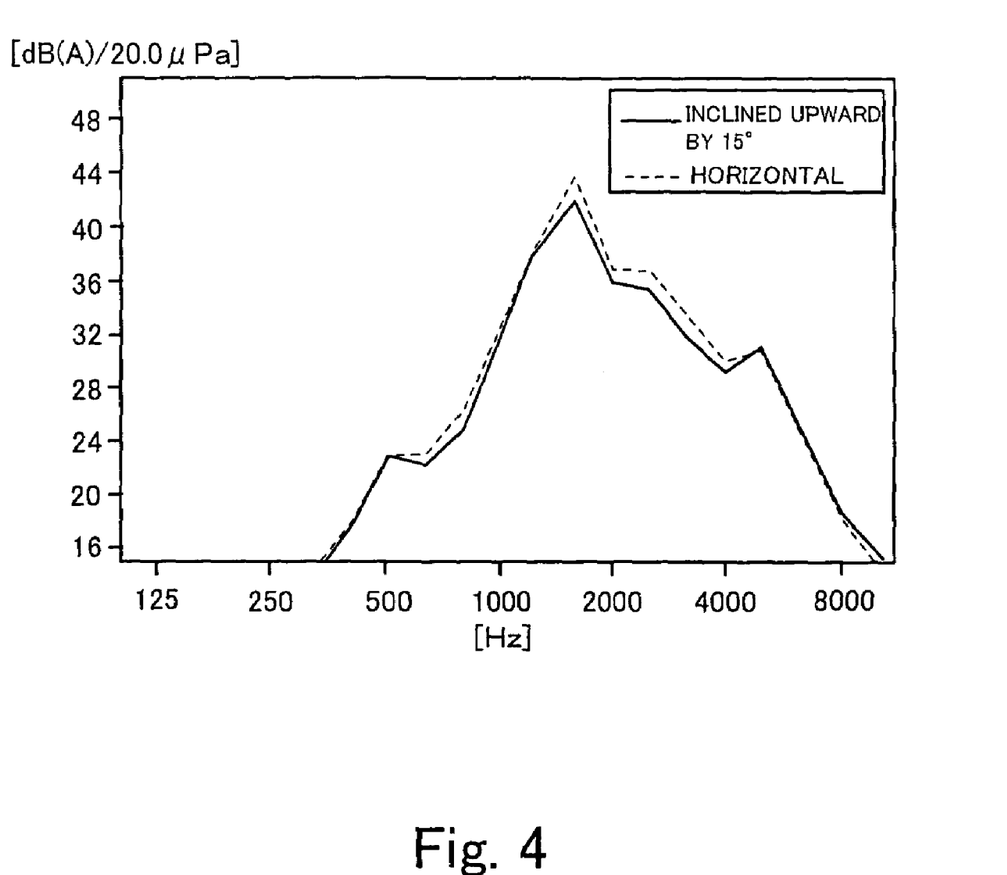
FIG. 4 is a graph showing the result of one-third octave analysis of noise from the notebook personal computer shown in FIG. 1.

FIG. 4 is a graph showing the result of one-third octave analysis of noise produced by the notebook personal computer 1 of the first embodiment.

In FIG. 4, the horizontal axis of the graph indicates the frequency (Hz), and the vertical axis indicates the sound pressure level (dB/20.0 µPa).

As will be described later, the main housing 10 of the notebook personal computer 1 is placed on the desk 91 with a sound absorber 30 disposed therebetween. However, noise during use was measured according to the Japanese Industrial Standards X7779 in a state in which the sound absorber 30 was removed and the bottom face 101 of the main housing 10 was directly placed on the desk 91. As a comparative example, a similar measurement was taken of noise produced by a notebook personal computer having the same structure as that of the notebook personal computer 1 of the first embodiment except that the exhaust opening pointed in the horizontal direction. An A-weighting filter was used for frequency analysis of both the notebook personal computers.

In the graph shown in FIG. 4, the solid line indicates the measurement result of the notebook personal computer 1 in which the exhaust opening 130 points obliquely upward at an angle of 15° to the normal, and the dotted line indicates the measurement result of the notebook personal computer as the comparative example in which the exhaust opening points in the horizontal direction.

In the notebook personal computer as the comparative example, the sum of the sound pressure levels within the range of 100 Hz to 10 kHz of the one-third octave band center frequency was 46.6 dB. In contrast, in the notebook personal computer 1 of the first embodiment, the sum was 45.6 dB. That is, the noise was reduced by 1.0 dB. The noise was reduced because wind noise resulting from exhaust air was prevented.

A detailed description will now be given of the sound absorber 30 shown in FIG. 1.

The sound absorber 30 is made of a foamed material fixed to the bottom face 101 of the main housing 10 so as to cover the entire bottom face 101. When the notebook personal computer 1 is placed on the installation surface, as shown in FIG. 1, the sound absorber 30 is clamped between the installation surface and the bottom face 101 of the main housing 10, and is resiliently squashed. The bottom face 101 of the main housing 10 has a space in which a cover member is detachably fitted from the side. For this reason, sound produced inside the main housing 10 (e.g., rotation sound of the fan 15 shown in FIG. 2) leaks from the space. However, the sound is prevented by the sound absorber 30 from further leaking forward along the bottom face 101. Although the sound produced inside the main housing 10 is also emitted from the exhaust opening 130, it is prevented by the squashed sound absorber 30 from further leaking forward along the bottom face 101. Consequently, sound produced inside the main housing 10 is prevented from being transmitted to the front user, and the user can comfortably use the electronic apparatus.

Noise from a commercially available notebook personal computer having an opening in a bottom face of a main housing was measured at the user position in a state in which a sound absorber was bonded to the entire bottom face. The result of the measurement will be described below.

Figure 5:
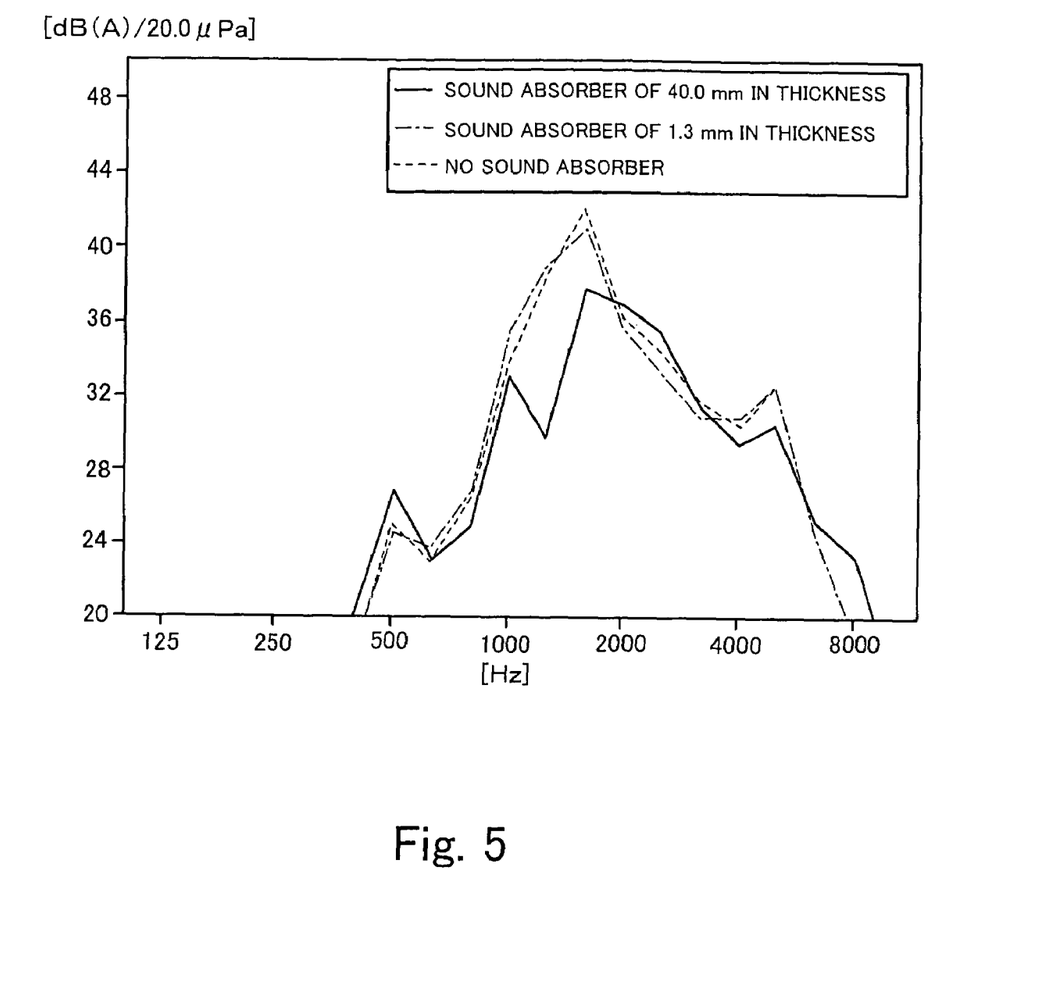
FIG. 5 is a graph showing the result of one-third octave analysis of noise from a commercially available notebook personal computer.

FIG. 5 is a graph showing the result of one-third octave analysis of noise produced by the commercially available notebook personal computer.

In FIG. 5, the horizontal axis of the graph indicates the frequency (Hz), and the vertical axis indicates the sound pressure level (dB/20.0 µPa).

Two types of sponges, a sponge having a thickness of 1.3 mm and a sponge having a thickness of 40.0 mm, were prepared as sound absorbers. Before the sponges are bonded, the bottom face of the main housing was directly placed on the desk, and noise during use was measured according to the Japanese Industrial Standards X7779. Subsequently, noise measurement was similarly taken while each of the sponges having different thicknesses was bonded to the entire bottom face, and the notebook personal computer was placed on the installation surface so that the sponge was clamped between the bottom face and the installation surface. In both the measurements, an A-weighting filter was used for frequency analysis.

In the graph shown in FIG. 5, the solid line indicates the result of measurement taken when the sponge having a thickness of 40.0 mm was bonded to the notebook personal computer, the one-dot chain line indicates the result of measurement taken when the sponge having a thickness of 1.3 mm was bonded, and the dotted line indicates the result of measurement taken when the notebook personal computer has no sponge.

In the notebook personal computer having no sponge, the sum of the sound pressure levels within the range of 100 Hz to 10 kHz of the one-third octave band center frequency was 45.8 dB. In contrast, in the notebook personal computer having the sponge of 1.3 mm in thickness, the sum was 44.7 dB. That is, a noise reduction of 1.1 dB was provided. In the notebook personal computer having the sponge of 40.0 mm in thickness, the sum was 43.8 dB, and a noise reduction of 2.0 dB was provided. The noise was reduced because sound leaking from the opening and sound emitted from the exhaust opening 130 were insulated or absorbed by the sponge bonded to the bottom face 101.

Modifications of the sound absorber 30 will now be described. In the following description, components having the same functions as those of the above-described components are denoted by the same reference numerals.

Figure 6:
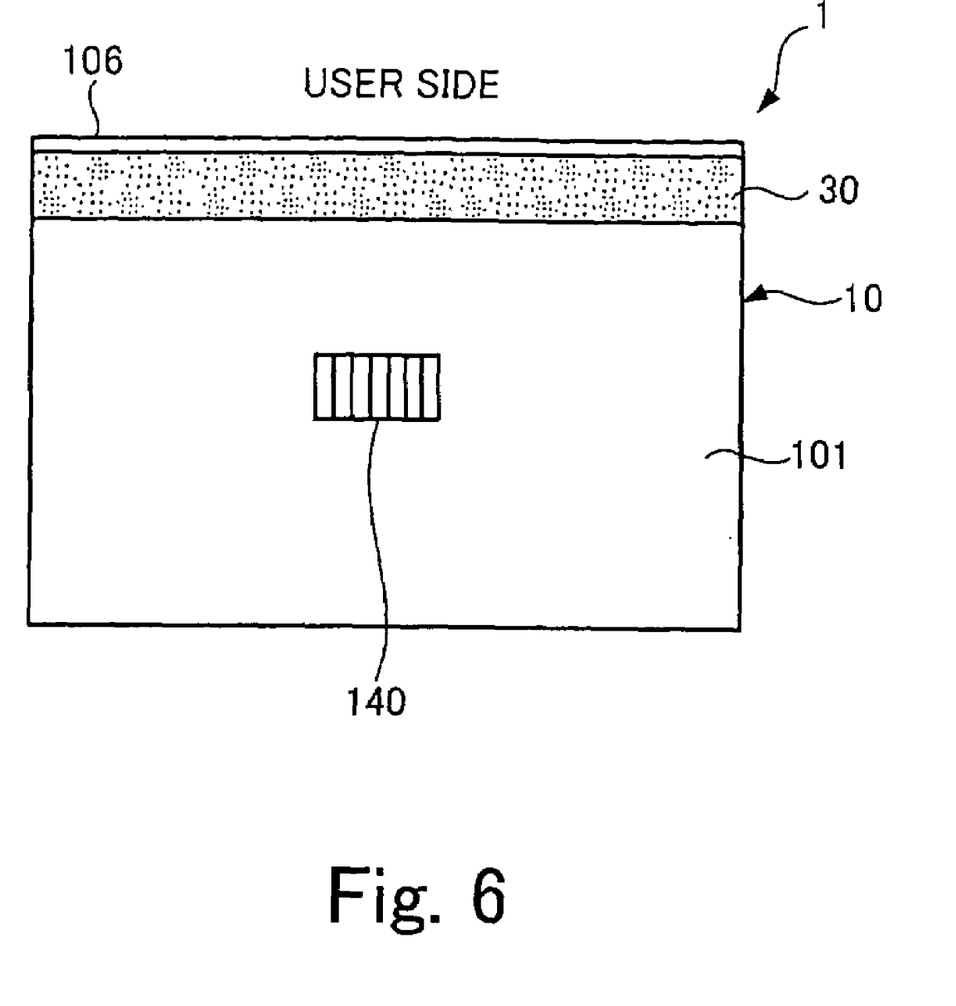
FIG. 6 is a schematic view of a bottom face to which a belt-shaped sound absorber is fixed.

FIG. 6 shows a bottom face to which a belt-shaped sound absorber is fixed.

Referring to FIG. 6, an air intake 140 is provided at the center of a bottom face 101 of a main housing 10 of a notebook personal computer 1 so as to communicate with a suction opening of a fan incorporated in the main housing 10. Rubber legs (not shown) are provided at the four corners of the bottom face 101. Therefore, when the notebook personal computer 1 is placed on the installation surface, a space corresponding to the height of the rubber legs is formed between the installation surface and the bottom face 101. While external air is introduced into the main housing 10 from the air intake 140, sound produced inside the main housing 10 leaks from the air intake 140. The sound is also emitted from an exhaust opening 130, and leaks forward through the space between the installation surface and the bottom face 101.

A belt-shaped sound absorber 30 shown in FIG. 6 is made of a foamed material such as Styrofoam, and extends to link both sides of the main housing 10 between the air-intake face 140 and a front edge 106 (user-side edge) of the main housing 10. When the notebook personal computer 1 is placed on the installation surface, the belt-shaped sound absorber 30 is also clamped between the bottom face 101 and the installation surface, and is resiliently squashed, thereby preventing sound leaking from the air intake 140 and sound emitted from the exhaust opening 130 from further leaking forward along the bottom face 101.

Figure 7:
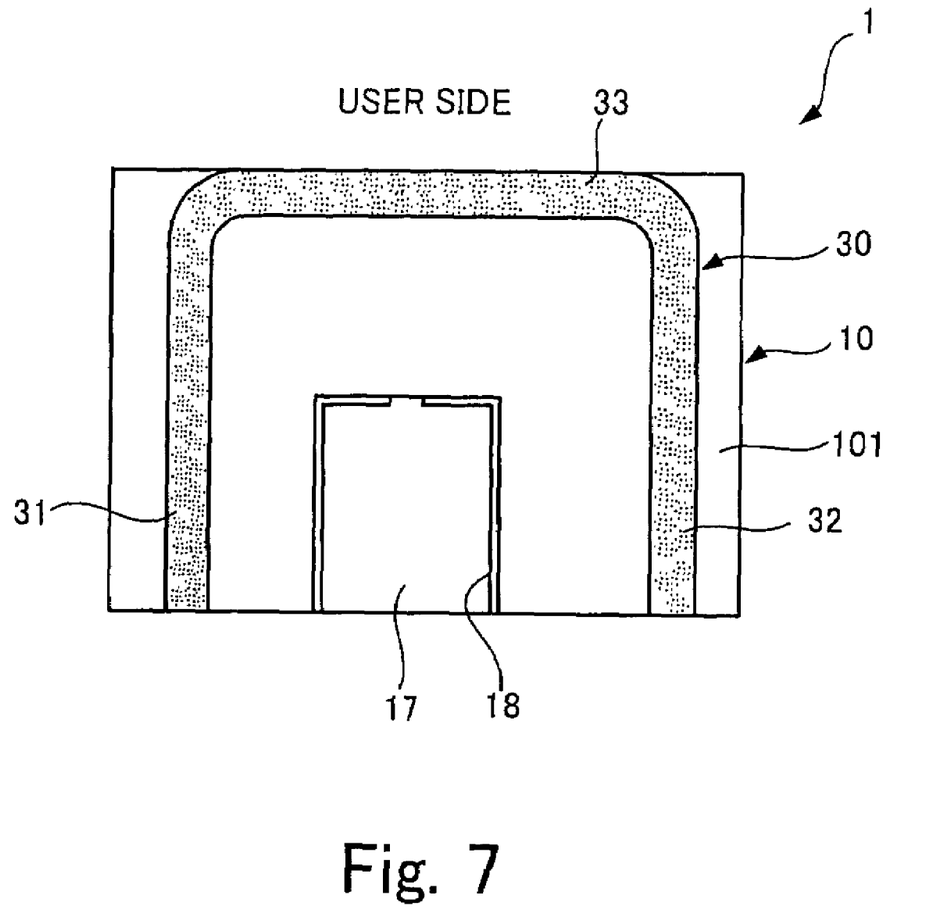
FIG. 7 is a schematic view of a bottom face to which an angular U-shaped sound absorber is fixed.

FIG. 7 shows a bottom face to which an angular U-shaped sound absorber is fixed.

A bottom face 101 of a main housing 10 of a notebook personal computer 1 shown in FIG. 7 has, at a rear end, a space 18 in which a cover member 17 is detachably fitted from the rear side. Sound produced inside the main housing 10 leaks from the space 18 and an exhaust opening 130.

An angular U-shaped sound absorber 30 is fixed to the bottom face 101 so as to surround the rear space 18 from the front side. The sound absorber 30 is made of a foamed material including portions 31 and 32 extending from the front side to the rear side on both sides of the bottom face 101, and a portion 33 extending in the widthwise direction to link front ends of the portions 31 and 32. When the notebook personal computer 1 is placed on the installation surface, the angular U-shaped sound absorber 30 is clamped between the bottom face 101 and the installation surface, and is resiliently squashed, thereby preventing sound leaking from the space 18 and the exhaust opening 130 from further leaking forward along the bottom face 101.

A modification in which the sound absorber 30 shown in FIG. 1 is replaced with a silencer will be described with reference to FIG. 8.

Figure 8:
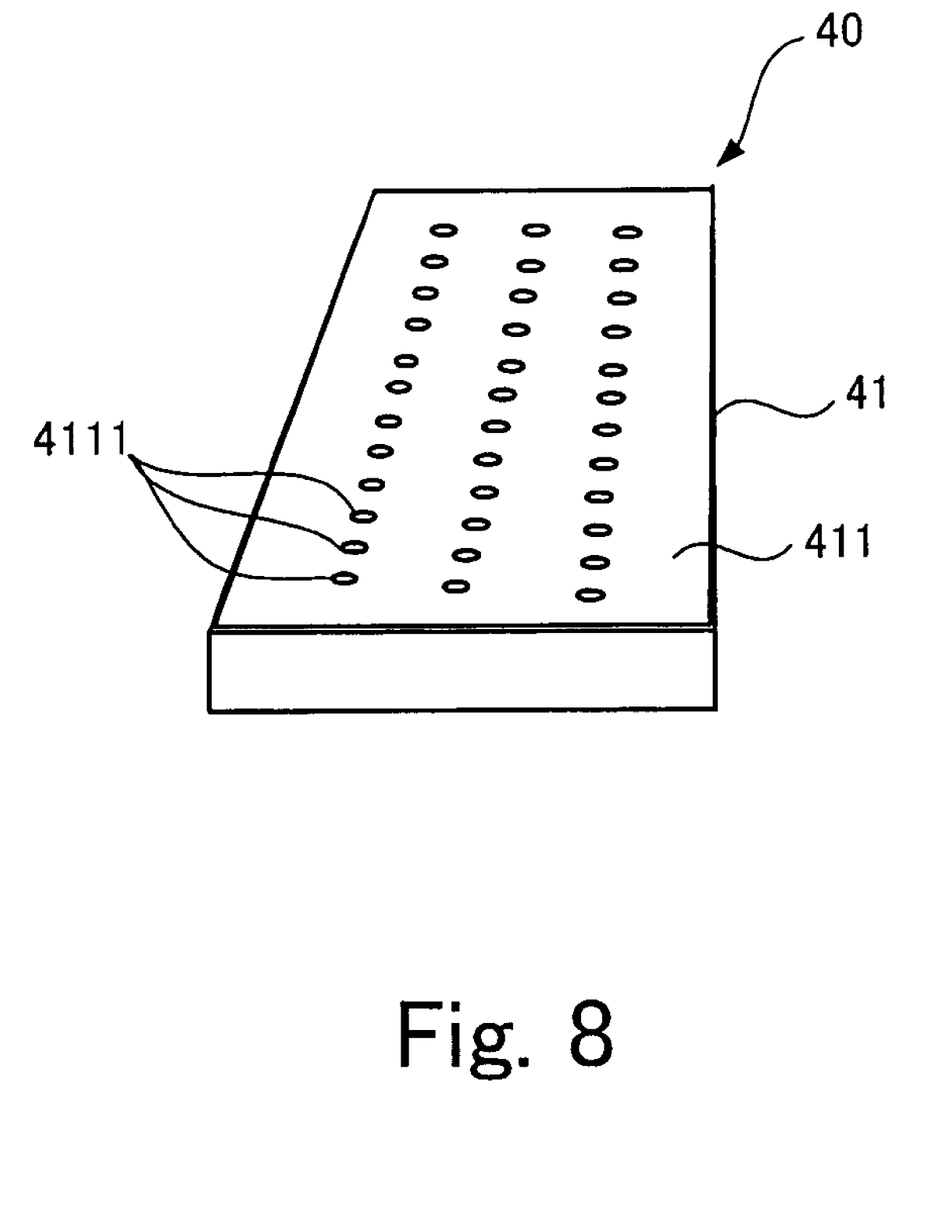
FIG. 8 is a perspective view of a silencer.

FIG. 8 is a perspective view of a silencer 40. The silencer 40 is also fixed to the bottom face 101 of the main housing 10 so as to cover the entire bottom face 101, in a manner similar to that in the sound absorber 30 shown in FIG. 1. The silencer 40 eliminates sound by introducing a sound wave from the outside and propagating the sound wave therethrough. The silencer 40 has a housing 41 that separates the interior from the exterior. The housing 41 has a wave entrance surface 411 into which an external sound wave comes. The wave entrance surface 411 has multiple holes 4111 that link the interior and the exterior of the housing 41. The silencer 40 is fixed to the bottom face 101 of the main housing 10 so that the wave entrance surface 411 opposes the bottom face 101. Therefore, sound leaking from the opening of the bottom face 101 passes through the holes 4111 provided in the wave entrance surface 411, enters the housing 41 of the silencer 40, and is eliminated and is prevented from leaking toward the front side of the main housing 10. Sound emitted from the exhaust opening 130 is also insulated by the silencer 40, and is prevented from leaking toward the front side of the main housing 10.

A description will be given of a second embodiment of the present invention. To avoid redundancy, characteristic points of the second embodiment will be described below.

Figure 9:
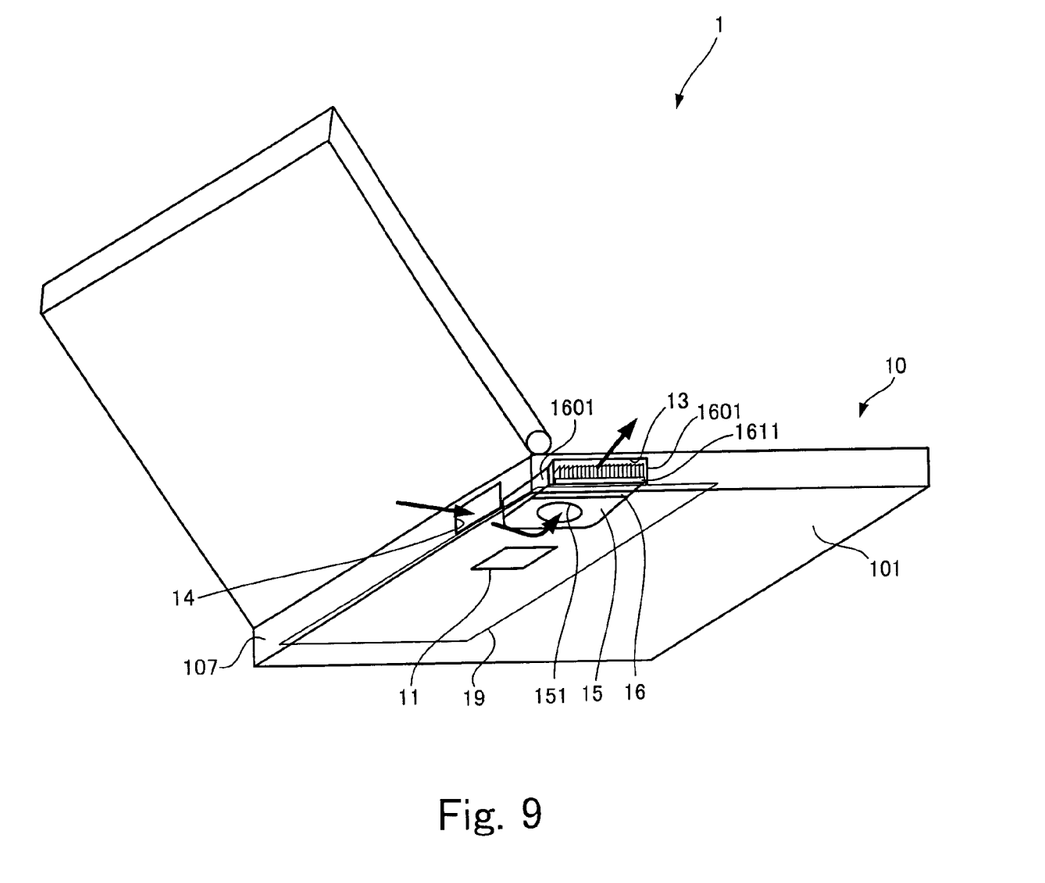
FIG. 9 is a perspective view of a notebook personal computer according to a second embodiment of the present invention, as viewed from a bottom face of a main housing.

FIG. 9 is a perspective view of a notebook personal computer according to the second embodiment of the present invention, as viewed from a bottom face of a main housing.

A notebook personal computer 1 of the second embodiment shown in FIG. 9 also incorporates a fan 15 and a duct 16 inside a main housing 10. The fan 15 and the duct 16 are disposed at a short distance from a bottom face 101 of the main housing 10. Electronic components, such as a CPU 11, are mounted on a substrate 19, and a heat conductor 1611 of a heat sink is thermally connected to the CPU 11 that generates much heat. The thermal connection may be established directly or indirectly. The left front side and the right rear side of FIG. 9 are designated, respectively, as the rear side and the front side of the main housing 10. An air intake 14 is provided in a rear face 107 of the main housing 10 so as to communicate with a suction opening 151 of the fan 15. External air is introduced into the main housing 10 from the air intake 14, reaches the suction opening 151 of the fan 15 along the bottom face 101, and passes through the duct 16, as shown by the arrows. The duct 16 includes a pair of opposing standing walls 1601. The duct 16 communicates with an exhaust opening 13, and air passing through the duct 16 is exhausted from the exhaust opening 13. The exhaust opening 13 is provided on a side face of the main housing 10, and points in the horizontal and sideward direction. The size of the exhaust opening 13 is equal to the size of an aperture of the duct 16 communicating therewith.

Figure 10:
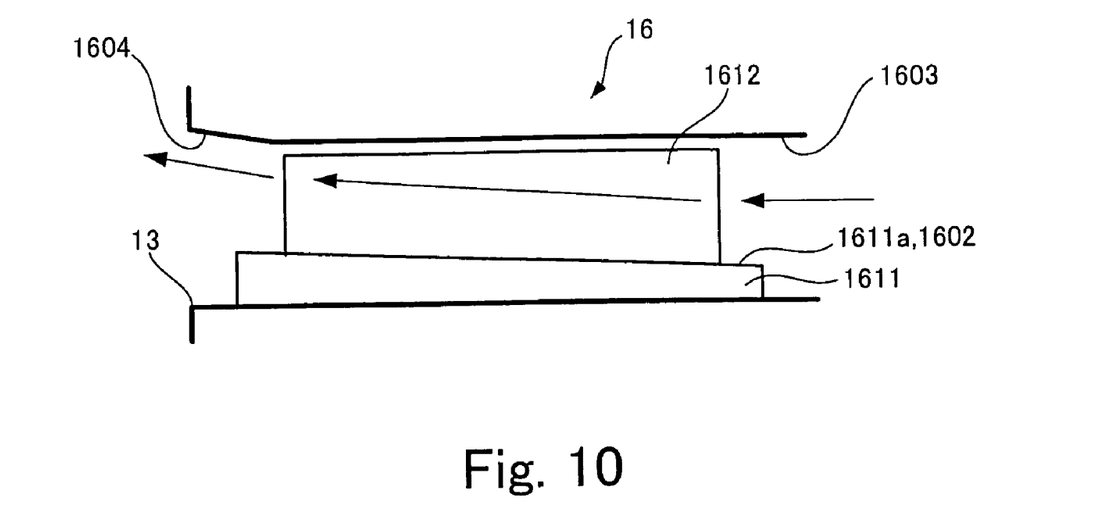
FIG. 10 is an explanatory view showing the interior of a duct incorporated in the main housing shown in FIG. 9 and connected to an exhaust opening, as viewed from a standing wall.

FIG. 10 shows the interior of the duct 16, as viewed from the side of one of the standing walls 1601.

Air introduced from the suction opening 151 shown in FIG. 9 is sent from right to left by the fan 15, and is exhausted from the exhaust opening 13 at the left side, as shown by the arrows in FIG. 10. The heat conductor 1611 extending in the right-to-left direction of FIG. 10 is shaped like a plate, and gradually increases in thickness toward the exhaust opening 13. That is, the heat conductor 1611 has an upper surface 1611a that is inclined upward toward the exhaust opening 13. A bottom face 1602 of the duct 16 shown in FIG. 10 is defined by the inclined upper surface 1611a, and air passing between fins 1612 is sent obliquely upward toward the exhaust opening 13. Therefore, air from the fan 15 is directed obliquely upward toward the exhaust opening 13 by the duct 16, and is exhausted from the exhaust opening 13 in the obliquely upward and sideward direction. As a result, the exhaust air does not hit the installation surface, the rear wall 92, and the display housing 20 opened to slightly tilt rearward, in a manner similar to that in the air exhausted from the exhaust opening 130 pointing obliquely upward and sideward shown in FIG. 3. Consequently, wind noise is prevented from being produced by the exhaust air. Moreover, since the exhaust air does not hit the user, the user can comfortably use the notebook personal computer 1 of the second embodiment.

An upper surface 1603 of the duct 16 shown in FIG. 10 has an inclined portion 1604 that is inclined away from the duct bottom surface 1602 toward the exhaust opening 13. If the upper surface 1603 is horizontal while the bottom surface 1602 is inclined upward, the duct 16 is narrowed toward the exhaust opening 13, the velocity of air passing through the duct 16 increases, and wind noise may be produced when the air passes through the exhaust opening 13. However, since the inclined portion 1604 is provided on the duct upper surface 1603, the velocity of air decreases at the inclined portion 1604, and wind noise is not produced at the exhaust opening 13.

Figure 11:
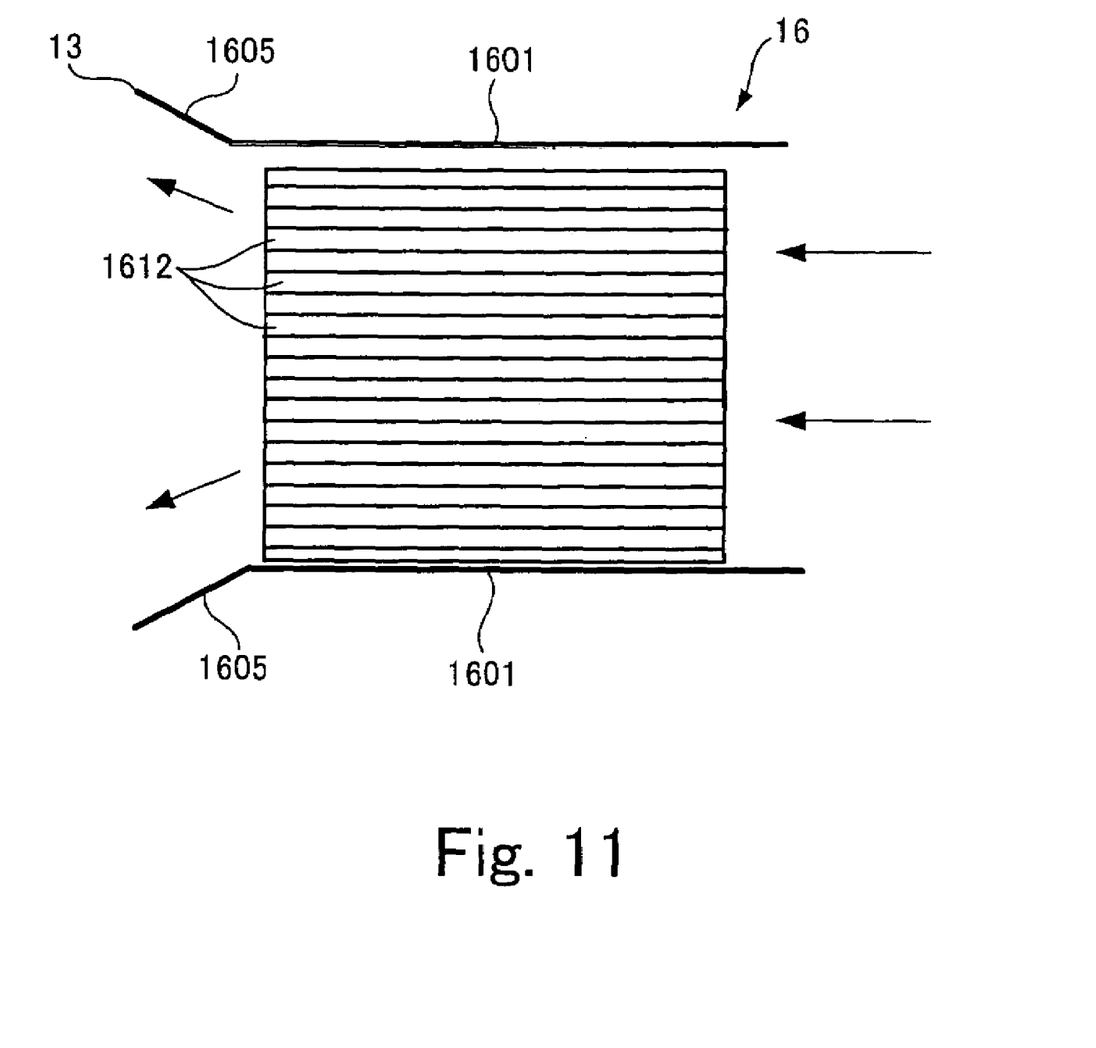
FIG. 11 is a top view of the interior of the duct shown in FIG. 9.

FIG. 11 is a top view of the interior of the duct 16 incorporated in the main housing 10 shown in FIG. 9.

Referring to FIG. 11, air introduced from the suction opening 151 shown in FIG. 9 is sent from right to left, passes between the fins 1612, and is exhausted from the exhaust opening 13 at the left end. The standing walls 1601 of the duct 16 have respective wide portions 1605 that extend away from each other toward the exhaust opening 13. When the air passes between the wide portions 1605, the velocity thereof decreases, and therefore, wind noise is not produced at the exhaust opening 13.

In order to reduce the thickness of the main housing 10, the inclined portion 1604 shown in FIG. 10 is omitted so that the upper surface 1603 is horizontal, and only the wide portions 1605 shown in FIG. 11 are provided.

In the notebook personal computer 1 described above, wind noise due to exhaust air is avoided, and sound leaking from the opening of the bottom face is prevented from reaching the user. Moreover, exhaust air does not hit the user. Therefore, the user can comfortably use the electronic apparatus.

The present invention is not limited to the above embodiments in which the notebook personal computers are used as electronic apparatuses. For example, the present invention is also applicable to other various electronic apparatuses such as ubiquitous products.

What is claimed is:

1. An electronic apparatus to be placed on an installation surface during use, comprising:
    a housing that accommodates an electronic component, and that includes a bottom face to be placed on the installation surface during use, and a front face standing from the bottom face to define a front edge of the housing and facing a user during use; and
    a fan provided inside the housing to exhaust air out of the housing,
    wherein the housing further includes an exhaust opening pointing in an obliquely upward and sideward direction, and the air from the fan is exhausted through the exhaust opening, wherein said exhaust opening is located on a side perpendicular to the front face of the electronic apparatus.

2. The electronic apparatus according to claim 1, wherein the exhaust opening is provided above the vertical center of the housing.

3. An electronic apparatus to be placed on an installation surface during use, comprising:
    a housing that accommodates an electronic component, and that includes a bottom face to be placed on the installation surface during use, and a front face standing from the bottom face to define a front edge of the housing and facing a user during use; and
    a fan provided inside the housing to exhaust air out of the housing, p1 wherein the housing further includes an exhaust opening pointing sideward so that the air from the fan is exhausted therethrough, and a duct provided inside the housing to direct the air from the fan obliquely upward toward the exhaust opening.

4. The electronic apparatus according to claim 3, further comprising:
    a heat conductor that conducts heat from the electronic component, and that has an upper surface inclined upward toward the exhaust opening,
    wherein a bottom face of the duct is defined by the upper surface.

5. The electronic apparatus according to claim 4, wherein the upper surface of the duct has an inclined portion inclined away from the bottom face toward the exhaust opening.

6. The electronic apparatus according to claim 4, wherein the duct includes a plurality of fins standing from the heat conductor inside the duct so that air channels are provided between the fins.

7. An electronic apparatus to be placed on an installation surface during use, comprising:
    a housing that accommodates an electronic component, and that includes a bottom face to be placed on the installation surface during use, and a front face standing from the bottom face to define a front edge of the housing and facing a user during use; and
    a fan provided inside the housing to exhaust air out of the housing,
    wherein the housing further includes an exhaust opening from which the air from the fan is exhausted, and a duct provided inside the housing to direct the air from the fan toward the exhaust opening, and
    wherein the duct has a pair of opposing standing walls, and the standing walls have respective wide portions that extend away from each other toward the exhaust opening, wherein said air from said exhaust opening is free of any further diversion from the electronic apparatus.

8. An electronic apparatus to be placed on an installation surface during use, comprising:
    a housing that accommodates an electronic component, and that includes a bottom face to be placed on the installation surface during use, the bottom face having an opening from which sound produced inside the housing leaks, and a front face standing from the bottom face to define a front edge of the housing and facing a user during use;
    a sound insulator clamped between the bottom face and the installation surface to prevent the sound leaking from the opening from further leaking forward along the bottom face, and wherein said bottom face is free of an air exhaust opening.

9. The electronic apparatus according to claim 8, wherein the sound insulator is made of a foamed material that is resiliently squashed when being clamped between the bottom face and the installation surface.

10. The electronic apparatus according to claim 8, wherein the sound insulator performs sound elimination by causing a sound wave to travel therethrough.

11. The electronic apparatus according to claim 8, wherein the sound insulator entirely covers the bottom face.

* * * * *